United States Patent [19]
Moenkhaus

[11] Patent Number: 6,026,836
[45] Date of Patent: Feb. 22, 2000

[54] HIGH PRESSURE DIAPHRAGM VALVE

[75] Inventor: Patrick R. Moenkhaus, Mounds View, Minn.

[73] Assignee: Honeywell Inc., Minneapolis, Minn.

[21] Appl. No.: 09/105,565

[22] Filed: Jun. 26, 1998

[51] Int. Cl.[7] .................................................. F16K 31/126
[52] U.S. Cl. .............................. 137/1; 251/331; 251/284; 251/64
[58] Field of Search .................................... 251/331, 284, 251/64; 137/1

[56] References Cited

U.S. PATENT DOCUMENTS

| | | | |
|---|---|---|---|
| 3,511,472 | 5/1970 | Zimmerman | 251/331 X |
| 3,556,465 | 1/1971 | Little . | |
| 4,014,514 | 3/1977 | Priese et al. | 251/331 |
| 4,171,792 | 10/1979 | Bass . | |
| 4,475,711 | 10/1984 | Rountry . | |
| 5,104,090 | 4/1992 | Grizzle et al. . | |
| 5,335,691 | 8/1994 | Kolenc . | |
| 5,383,646 | 1/1995 | Weingarten | 251/331 X |
| 5,722,638 | 3/1998 | Miller et al. . | |

OTHER PUBLICATIONS

Honeywell Brochure Form No. 60–2080–8 (Rev. 9–94); entitled "V48A,F,J; V88A,J Diaphragm Gas Valves".
Honeywell Brochure Form No. 65–0212–1 (Rev. 10–97); entitled "V4943A/V8943A On/Off Diaphragm Gas Valves".
Honeywell Brochure Form NO. 65–0214–1 (Rev. 10–97); entitled V4943/V8943B,C,N; V4944/V8944B,C,L,N Regulating Diaphragm Gas Valves.

*Primary Examiner*—Kevin Lee
*Attorney, Agent, or Firm*—Charles L. Rubow

[57] ABSTRACT

A diaphragm valve including structure which incorporates a support surface positioned to limit extension away from a main valve seat of a valve seat closure diaphragm. Alternative embodiments have the support surface formed on an insert within the valve housing, and formed as part of the interior surface of a wall of the housing. Alternatives for conveying control pressure to the side of the seat closure diaphragm adjacent the support surface include forming the surface on a body of porous material, and forming the surface with a channel which communicates with a relief port. Inclusion of a support surface minimizes stress and strain in the closure diaphragm when the valve is in an open state, thereby increasing the allowable valve working pressure.

16 Claims, 4 Drawing Sheets

HIGH PRESSURE DIAPHRAGM VALVE

BACKGROUND OF THE INVENTION

The present invention generally relates to diaphragm valves. More particularly, it relates to a diaphragm gas valve configured for high pressure applications.

Diaphragm valves, such as diaphragm gas valves and diaphragm liquid valves, have long been used to control fluid flow in a wide variety of home and industrial applications. For example, diaphragm gas valves are used with atmospheric boilers, commercial water heaters, duct furnaces, makeup air and rooftop heaters, to name but a few. In conjunction with these various applications, diaphragm gas valves are typically suitable for controlling liquefied petroleum (LP), natural, and manufactured gases.

Generally speaking, diaphragm gas valves are designed to regulate gas flow, and/or serve as safety shutoffs. Depending upon size and operating conditions, diaphragm gas valves are normally rated for use with gas line pressures in the range of 0.5–5 psi (3.4–34.5 kPa). As described below, certain inherent design constraints prevent diaphragm gas valves of conventional design from being used in higher pressure applications. For high pressure gas flow control, a motorized gas valve is generally employed. Motorized gas valves, while effective, are more complex, and therefore expensive, than diaphragm gas valves.

Regardless of the exact application or function, diaphragm valves share a relatively standard component configuration and arrangement. A diaphragm valve normally includes a valve housing, a flexible diaphragm and a control assembly. The valve housing is defined by an upper housing section and a lower housing section that mate with one another, forming a fluid inlet, a fluid outlet and a valve seat. The valve seat is positioned between the fluid inlet and the fluid outlet such that fluid flows from the fluid inlet, through the valve seat, to the fluid outlet. The diaphragm is sealed between the two housing sections, adjacent the valve seat. This arrangement creates an upper control chamber above the diaphragm (i.e., between the diaphragm and the upper housing section) and a lower working chamber below the diaphragm (i.e., between the diaphragm and the lower housing section). Finally, the control assembly is associated with the valve housing and controls movement of the diaphragm. One typical form of a control assembly is a pilot operator valve that includes a fluid connection to the working chamber for sampling fluid entering the valve housing, a fluid connection to the control chamber for directing movement of the diaphragm via the control chamber, and a bleed port fluidly connected to atmospheric pressure. A solenoid pilot valve closure assembly or similar mechanism within the control assembly dictates a valve open or valve closed state of the diaphragm valve.

During use, the control assembly may call for a valve closed state. In this regard, the control assembly creates a pressure above the diaphragm to position the diaphragm in a sealed arrangement with the valve seat. In particular, the pressure above the diaphragm is equalized with the pressure below the diaphragm, allowing the diaphragm to position and seal against the valve seat. Once sealed, the diaphragm prevents fluid flow to the fluid outlet. Conversely, when the control assembly calls for a valve open state, the control assembly creates a pressure differential across the diaphragm by reducing the pressure above the diaphragm (in the control chamber). In response to this reduction in pressure, the diaphragm extends away from the valve seat, or "inflates". In other words, the control assembly reduces pressure above the diaphragm to a level less than the pressure in the working chamber. The pressure in the working chamber forces the diaphragm to extend away from the valve seat, allowing fluid to flow to the fluid outlet.

A variety of modifications can be made to the above-described design for improved performance. For example, a weight and/or a spring mechanism may be associated with the diaphragm to assist in forcing the diaphragm into engagement with the valve seat. Generally speaking, however, operation of the diaphragm valve remains the same. Namely, positioning of the diaphragm determines whether the valve is open or closed. The diaphragm seals against the valve seat in the valve closed state. Conversely, the diaphragm extends (or inflates) away from the valve seat to open the valve.

While this approach is widely accepted, a potential design constraint does exist. The diaphragm is normally made of a flexible, non-metallic material, such as rubber. In the valve open state, pressure within the working chamber imparts a force on the diaphragm, developing a stress and strain across the diaphragm material as the diaphragm extends. At relatively low working chamber pressures, this internal stress and strain has virtually no effect on diaphragm integrity, as the elasticity of the diaphragm material provides for complete recovery once the pressure is equalized. The diaphragm will continue to extend without failure in response to the working chamber pressure to a maximum working extension, which is defined as the maximum extension at which the diaphragm will reliably function over a long period of time. If the diaphragm is subject to further extension beyond this critical force or extension value, the stress and strain across the diaphragm material increases exponentially. The pressure acting on the diaphragm overcomes the inherent strength of the material used for the diaphragm, causing permanent structural damage or even rupture. Thus, the pressure rating of a diaphragm valve is limited by the strength of the diaphragm material itself. While the diaphragm material can be reinforced with a fabric weave, the same rupture problems will occur, albeit at somewhat higher working chamber gas pressures. As a result, failure of the diaphragm beyond the maximum working extension limits the operating pressure rating of most diaphragm gas valves to approximately 5 psi (34.5 kPa).

Diaphragm valves, and in particular diaphragm gas valves, are relatively inexpensive devices used for a wide variety of industrial control applications. Unfortunately, however, diaphragm valves are normally limited to relatively low pressure applications due to inherent constraints associated with the diaphragm material. Therefore, a need exists for a diaphragm valve able to consistently perform in high pressure applications.

SUMMARY OF THE INVENTION

One preferred embodiment of the present invention provides a high pressure diaphragm valve that includes a housing, a valve seat, a diaphragm and an engagement surface. The housing defines a fluid inlet and a fluid outlet. The valve seat is positioned within the housing between the fluid inlet and the fluid outlet. The diaphragm is also positioned within the housing, and is configured to extend from a seated position in which the diaphragm seals against the valve seat. Finally, the engagement surface is disposed within the housing. In this regard, the engagement surface is configured to limit extension of the diaphragm from the seated position.

Another aspect of the present invention relates to an insert for use in a diaphragm valve. The diaphragm valve includes a housing defining a fluid inlet and a fluid outlet, a valve seat positioned within the housing between the fluid inlet and the fluid outlet, and a diaphragm disposed within the housing adjacent the valve seat. The diaphragm is selectively extendable from a seated position, in which the diaphragm seals against the valve seat. The insert comprises a support member having an engagement surface configured to receive the diaphragm. The support member is positionable within the housing such that the engagement surface of the member body limits the diaphragm from exceeding a maximum working extension. In one preferred embodiment, the support member is porous. In another preferred embodiment, the support member further includes at least one port extending from the engagement surface. The at least one port prevents formation of a vacuum between the diaphragm and the engagement surface.

Yet another aspect of the present invention relates to a method of increasing a pressure rating of a diaphragm valve. The diaphragm valve includes a housing defining a fluid inlet and a fluid outlet, a valve seat positioned within the housing between the fluid inlet and the fluid outlet, and a diaphragm disposed within the housing adjacent the valve seat. The diaphragm is selectively extendable from a seated position in which the diaphragm seals against the valve seat. The method includes providing an engagement surface within the housing configured to receive the diaphragm. The engagement surface may be formed by an insert positioned within the housing which prevents the diaphragm from exceeding its maximum working extension.

DESCRIPTION OF THE PREFERRED EMBODIMENTS

Figure 1:
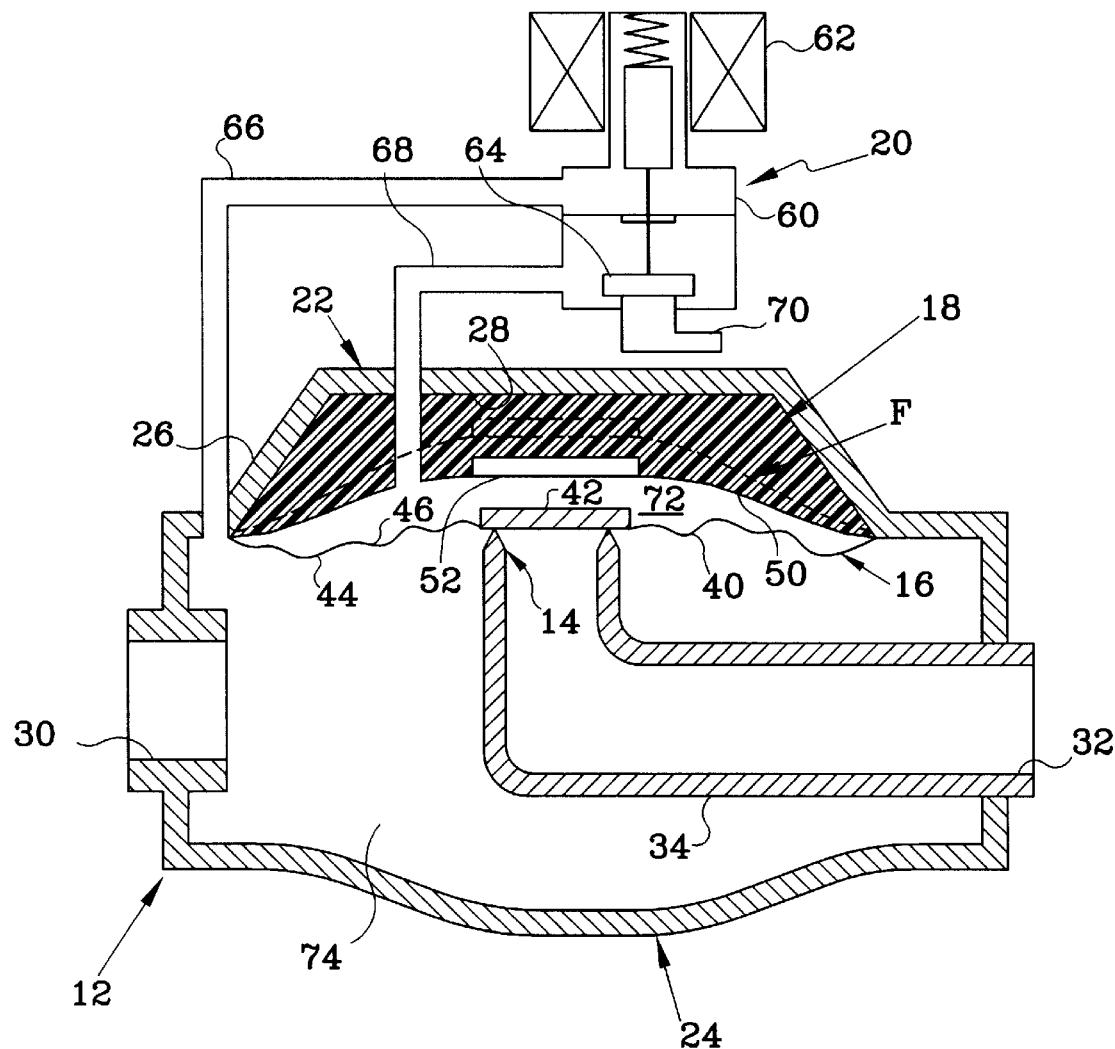
FIG. 1 is a cross-sectional view, partially in schematic form, of a diaphragm valve in accordance the present invention, the valve being in a closed state.

One preferred embodiment of a diaphragm valve 10 is shown in FIG. 1. Valve 10 includes a housing or body 12, a valve seat 14, a diaphragm 16, an insert 18 and a control assembly 20. Valve seat 14, diaphragm 16 and insert 18 are disposed within housing 12. Control assembly 20 is associated with housing 12 so as to control positioning of diaphragm 16 relative to valve seat 14 and insert 18. Diaphragm valve 10 is preferably configured to control flow of a pressurized gas. However, valves of the general design of valve 10 may be adapted to control liquid flow as well.

Housing 12 includes an upper housing section 22 and a lower housing section 24. Upper housing section 22 and lower housing section 24 mate with one another, forming an enclosure within which various other components of valve 10 are mounted. Upper housing section 22 includes a wall 26 having an interior surface 28. Lower housing section 24 forms a fluid inlet 30 and a fluid outlet 32.

Housing 12 will be described as including two separate housing sections 22, 24. Alternatively, housing 12 may be integrally formed. Similarly, fluid inlet 30 and fluid outlet 32 may be formed in upper housing section 22, or housing sections 22 and 24 may cooperate to form fluid inlet 30 and fluid outlet 32. In one preferred embodiment, housing 12 is a die-cast aluminum material. Alternatively, other rigid materials able to maintain constructional integrity at high internal pressures may also be suitable. Where diaphragm valve 10 is used for gas flow control, housing 12 is preferably made from a rigid material compatible with one or more of LP, manufactured or natural gas.

Valve seat 14 is disposed within housing 12. In one preferred embodiment, valve seat 14 is formed at an end of a conduit 34 otherwise formed by lower housing section 24. In this regard, conduit 34 is sealed to, or otherwise forms, fluid outlet 32 such that fluid within housing 12 can only exit through conduit 34.

Regardless of the exact configuration, valve seat 14 is positioned between fluid inlet 30 and fluid outlet 32. With this arrangement, fluid otherwise maintained within housing 12 must pass through valve seat 14 before exiting housing 12 via fluid outlet 32.

Diaphragm 16 includes a flexible fluid-tight membrane 40 and a weight 42. Diaphragm 16 defines a lower surface 44 and an upper surface 46. Lower surface 44 of diaphragm 16 is configured to selectively seal against valve seat 14. In one preferred embodiment, flexible membrane 40 is formed about weight 42. Alternatively, weight 42 may be attached to upper surface 46 of membrane 40.

Membrane 40 is preferably made of a rubber material commonly used in diaphragm gas valves. For example, membrane 40 may be made of acrylonitrilebutadiene rubber (Buna-N rubber or NBR). Alternatively, other fuel gas-compatible elastomers are also suitable. Further, the membrane may be reinforced with a fabric material. Where diaphragm valve 10 is used to control gas flow, the material chosen for membrane 40 must be compatible with the LP, natural and/or manufactured gas whose flow is to be controlled. Further, when secured at its outer periphery, membrane 40 is configured to extend in a generally convex shape while resisting a normal force on either lower surface 44 or upper surface 46, due to the elastic nature of the membrane. Where the force is relatively small, membrane 40 will remain stable in an extended position. In other words, the material of the membrane will maintain its integrity as only a minimal stress-strain is developed. Importantly, membrane 40 can be repeatedly and reliably forced to its maximum working extension without creating a defect. However, if membrane 40 is forced beyond its maximum working extension, the stress-strain thereacross will increase exponentially, thereby jeopardizing its integrity.

Weight 42 is preferably shaped and sized to assist in sealing diaphragm 16 to valve seat 14. For example, weight 42 may be a washer having a diameter slightly greater than a diameter of valve seat 14. Further, weight 42 has a predetermined mass such that with reference to the orientation shown in FIG. 1, the weight biases diaphragm 16 downwardly toward valve seat 14

Insert 18 is a support body or member that includes an engagement or support surface 50. Insert 18 is preferably shaped to nest within upper housing section 22, abutting interior surface 28 of wall 26. Further, engagement surface 50 is configured and/or contoured to receive diaphragm 16 when extended to slightly less than its maximum working extension. Thus, engagement surface 50 preferably has a generally concave configuration, and includes a recess 52 for receiving weight 42, as shown in FIG. 1.

Insert 18 is preferably formed of a relatively rigid material, such as a polyurethane foam. However, other relatively stable, gas compatible materials may also be suitable. For reasons described in greater detail below, it may be desirable to form insert 18 of a porous material. Alternatively, the engagement surface may be provided with some other feature for facilitating fluid flow and pressure equalization on the control chamber side of the diaphragm. Finally, the engagement surface may be formed directly on the interior of a wall of the housing, rather than on a separate insert.

Control assembly 20 is of a type commonly known in the art, and preferably includes a pilot valve chamber 60, a solenoid 62 having a plunger which carries a pilot valve closure member 64, a fluid supply passageway 66, a diaphragm control passageway 68 and a bleed passageway 70. Solenoid 62 is associated with pilot valve chamber 60 and controls positioning of closure member 64. Fluid supply passageway 66 provides a fluid connection between pilot valve chamber 60 and the housing 12. More particularly, passageway 66 directs fluid from below diaphragm 16 to pilot valve chamber 60. Diaphragm control passageway 68 provides a fluid connection between pilot valve chamber 60 and housing 12 at a point above diaphragm 16. Finally, bleed passageway 70 extends from pilot valve chamber 60 and is open to the atmosphere or directed into an attached device such as a combustion chamber. As described in greater detail below, control assembly 20 functions as a two-position (or a three-way valve) actuator for controlling the position diaphragm 16 relative to valve seat 14.

Except for incorporation of insert 18, diaphragm valve 10 of the present invention is of a conventional design, and may be manufactured by conventional methods. For example, lower housing section 24 is formed to include valve seat 14, as well as fluid inlet 30 and fluid outlet 32. The insert 18 is positioned within upper housing section 22, and may be secured in that position by means of a frictional or snap fit. Alternatively, an adhesive or other securing arrangement may be employed.

Diaphragm 16 is then sealed within housing 12. In one preferred embodiment, diaphragm 16 is secured between upper housing section 22 and lower housing section 24. More specifically, an outer periphery of membrane 40 is placed between the walls of upper housing section 22 and lower housing section 24. The upper housing section is then secured to the lower housing section by bolts or other fasteners. In this arrangement, diaphragm 16 is pinched between upper housing section 22 and lower housing section 24.

Diaphragm 16 is sized so as to provide some slack in membrane 40 when the diaphragm is in its seated position. As shown, diaphragm 16, in cooperation with upper housing section 22, creates a control chamber 72, and in cooperation with lower housing section 24, creates a working chamber or Region 74.

Finally, control assembly 20 is secured to housing 12, preferably to upper housing section 22 thereof. Pilot valve chamber 60, solenoid 62 and closure member 64 and passageways 66–70 are arranged as shown in FIG. 1. Specifically, fluid supply passageway 66 is connected to supply fluid at the pressure within working chamber 74 to pilot valve chamber 60. Conversely, diaphragm control passageway 68 is connected to supply pressure from pilot valve chamber 60 to control chamber 72. In this regard, insert 18 preferably includes an opening for receiving an end of diaphragm control passageway 68. Additionally, insert 18 is preferably porous so that fluid can freely flow between passageway 68 and control chamber 72. Finally, bleed passageway 70 is shown fluidly connecting pilot valve chamber 60 to atmospheric pressure.

In the gas valve application used herein for describing the invention, diaphragm valve 10 is connected between a main gas supply (not shown) and a gas utilization device, such as a burner (not shown), the main gas supply being connected to fluid inlet 30 and the utilization device being connected to fluid outlet 32. Diaphragm valve 10 functions to either inhibit gas flow from inlet 30 to outlet 32 (a valve closed state), or to allow gas flow to the outlet (a valve open state). FIG. 1 illustrates a valve closed state in which solenoid 62 is de-energized such that closure member 64 is in its lowered position, closing bleed passageway 70 and opening fluid supply passageway 66. Gas from working chamber 74, thus, flows through pilot valve chamber 60 into control chamber 72.

When the pressures on both the lower and upper surfaces of diaphragm 16 are balanced, weight 42 causes diaphragm 16 to seal against valve seat 14, thereby closing valve 10. In a preferred embodiment, if the main gas supply fails and there is no pressure in working chamber 74, weight 42 will also move diaphragm 16 to its seated position to maintain valve 10 in its closed state.

Figure 2:
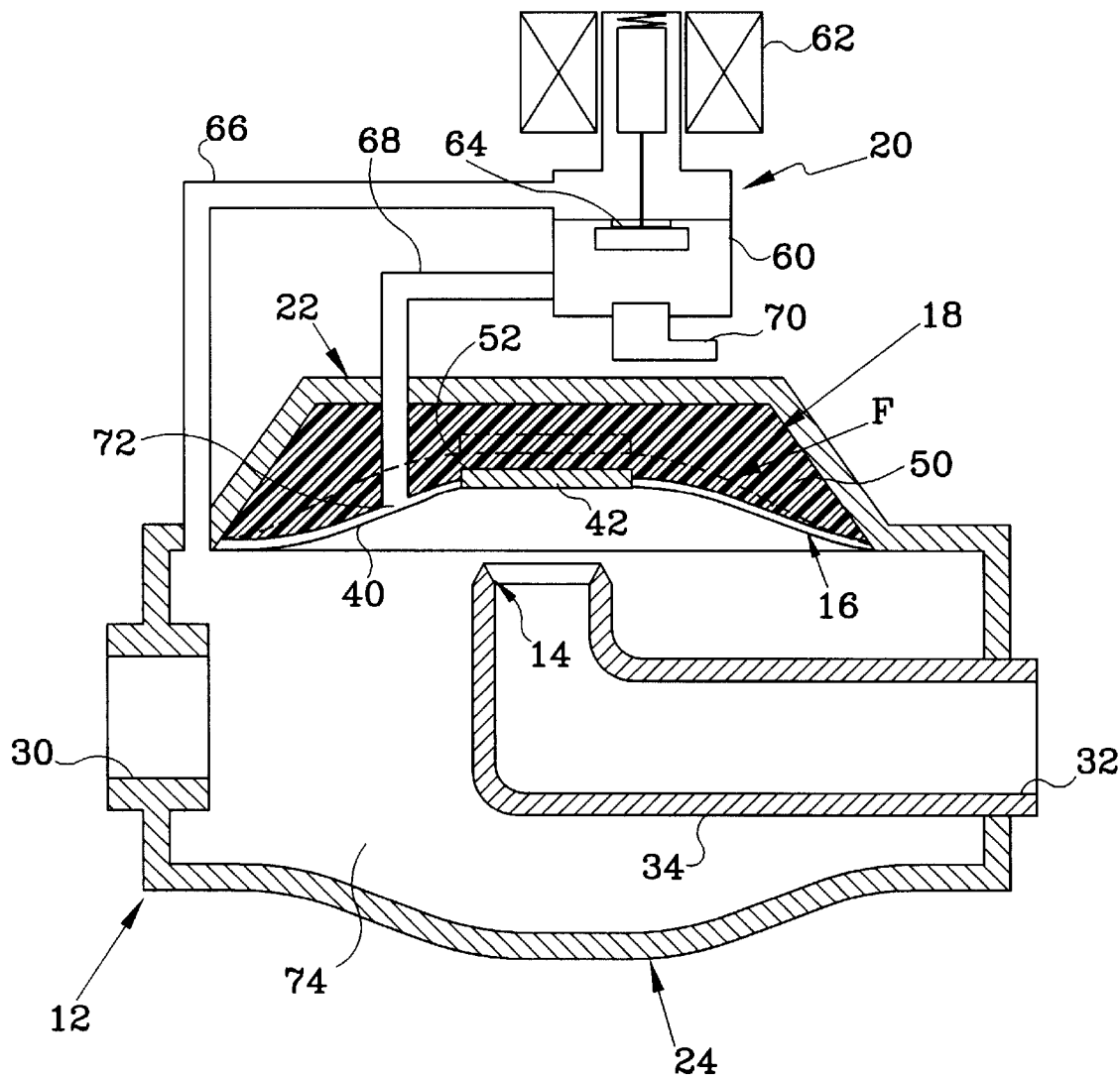
FIG. 2 is a cross-sectional view of the diaphragm valve of FIG. 1 in an open state.

As shown in FIG. 2, diaphragm valve 10 is opened by energizing solenoid 62, which in turn raises closure member 64 to its upper position. In this position, closure member 64 opens bleed passageway 70 and closes fluid supply passageway 66. Thus, the pressure in control chamber 72 is bled off through bleed passageway 70. Once the pressure in control chamber 72 decreases to a predetermined value below the pressure in working chamber 74, the pressure differential overcomes the effect of weight 42, and forces diaphragm 16 away from valve seat 14, thereby allowing flow through the valve seat.

Slack in membrane 40 allows diaphragm 16 to initially freely move away from valve seat 14. The pressure differential across diaphragm 16 causes it to continue to extend until it contacts engagement surface 50. As shown in FIG. 2, engagement surface 50 is generally concave so as to completely receive the diaphragm, with weight 42 extending into recess 52 in the engagement surface.

Absent some feature which limits the extension of diaphragm 16, a sufficient pressure differential applied across the diaphragm could cause it to extend beyond its maximum working extension. As previously described, insert 18 limits diaphragm 16 to an extension somewhat less than fully extended position F. Notably, the material characteristics of membrane 40 are such that the maximum working extension is only slightly less than fully extended position F. Insert 18 preferably limits extension of diaphragm 16 to approximately 75–95 percent of fully extended position F, and more preferably to 80–90 percent of the fully extended position. For example, where fully extended position F is 1 inch from valve seat 14, insert 18 may be arranged such that engagement surface 50 limits extension of diaphragm 16 to no more than ⅘ inch from valve seat 14.

By preventing diaphragm 16 from exceeding its maximum working extension, insert 18 minimizes the possibility of diaphragm rupture when diaphragm valve 10 is in its open state. Because diaphragm 16 is restrained from reaching its fully extended position, the diaphragm will not reach a stress-strain point at which bulging or rupturing would otherwise occur. Importantly, however, limiting extension of the diaphragm to just less than fully extended position F results in only a small reduction in capacity of the valve. The largest increase in flow through valve 10 occurs as diaphragm 16 initially lifts off valve seat 14. Proper use of insert 18 reduces the flow capacity less than one percent.

Insert 18 minimizes the possibility of rupture of diaphragm 16 as a design constraint on diaphragm valve 10, and allows the valve to be used in higher fluid pressure control applications. For example, use of insert 18 with a diaphragm gas valve otherwise having a pressure rating of 5 psi can increase the allowable working pressure to 20 psi rating or more. Because insert 18 can be made of an inexpensive material, the overall cost of the valve remains relatively low, especially in comparison to motorized gas valves normally used in high pressure gas control applications.

Figure 3:
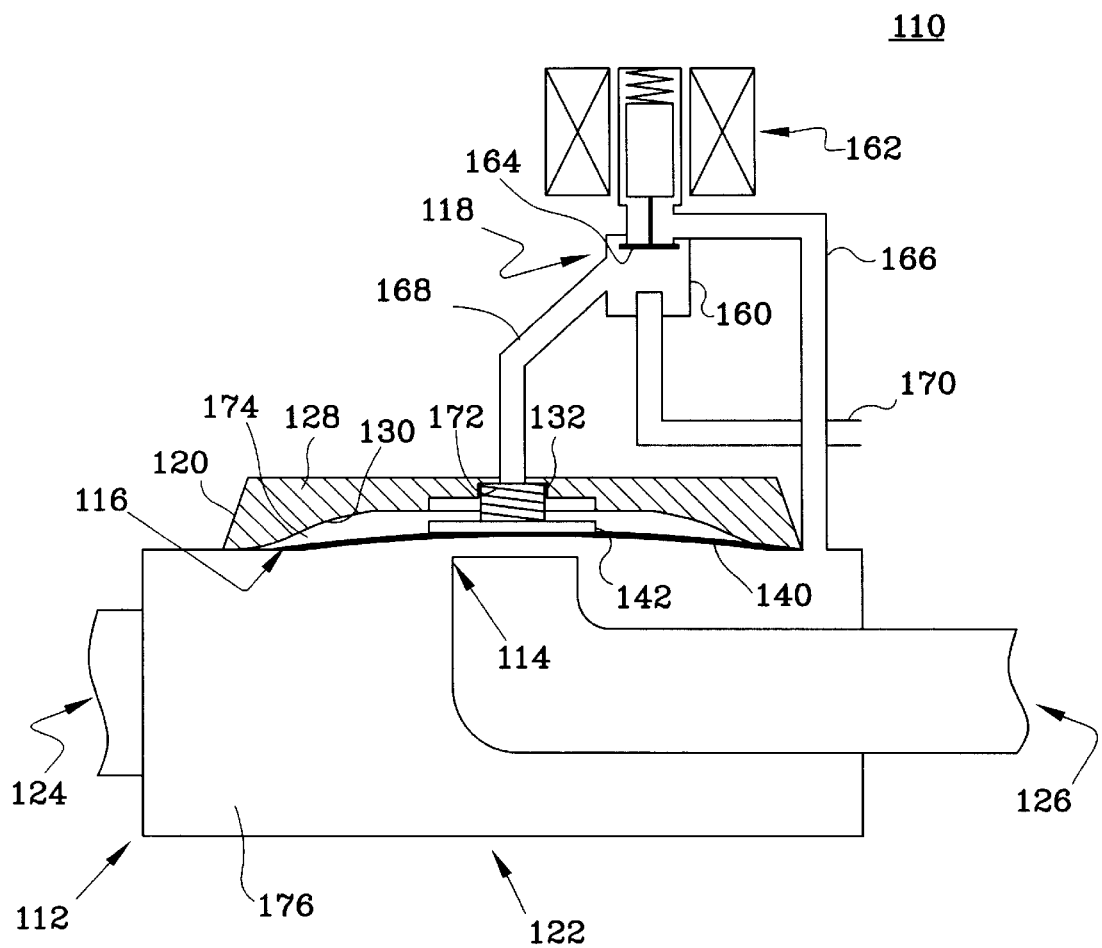
FIG. 3 is a schematic view, partially in cross section, of an alternative embodiment of a diaphragm valve in accordance with the present invention transitioning from a valve closed state to a valve open state.

Diaphragm valve 10 has been described as incorporating insert 18 as a separate component. It should be understood, however, that other arrangements may also be satisfactory. For example, an alternative diaphragm valve embodiment 110 is shown in FIG. 3. Diaphragm valve 110 includes a housing 112, a valve seat 114, a diaphragm 116 and a control assembly 118. Valve seat 114 and diaphragm 116 are located within the housing 112. Control assembly 118 associated with housing 112 functions to control movement of diaphragm 116 relative to valve seat 114.

Housing 112 is preferably formed of die-cast aluminum and includes an upper housing section 120 and a lower housing section 122. The upper housing section 120 mates with lower housing section 122 to form an enclosure within which valve seat 114 and diaphragm 116 are disposed. Lower housing section 122 preferably defines a fluid inlet 124 and a fluid outlet 126. Valve seat 114 is shown formed within lower housing section 122 between fluid inlet 124 and fluid outlet 126.

Upper housing section 120 includes a relatively thick wall 128 forming an interior engagement or support surface 130 contoured to receive diaphragm 116 when extended. Further, wall 128 is configured to form a spring retainer 132. Diaphragm 116 is generally identical to the diaphragm 16 (FIG. 1), previously described. In this regard, the diaphragm 116 includes a membrane 140 and a weight 142. A compression spring 172 is provided between diaphragm 116 and spring retainer 132.

Finally, control assembly 118 is of a type commonly known in the art and preferably includes a pilot valve chamber 160, a solenoid 162 having a plunger which carries a pilot valve closure member 164, a fluid supply passageway 166, a diaphragm control passageway 168, and a bleed passageway 170. The fluid supply passageway 166 is fluidly connected to a working chamber or region 176, and the diaphragm control passageway 168 is fluidly connected to a control chamber 174.

Except for formation of the engagement surface directly on the upper housing section and inclusion of a spring above the diaphragm, the construction of valve 110 is essentially identical to the construction of valve 10, and both valve embodiments operate in the same manner. Spring 172 functions to assist weight 142 in biasing diaphragm 116 toward valve seat 114. When the pressures on both sides of diaphragm 116 are balanced, weight 142 and spring 172 together force diaphragm 116 into a seated position with respect to valve seat 114. In the seated position, diaphragm 116 is sealed against valve seat 114, preventing gas flow to fluid outlet 126. Conversely, when solenoid 162 is energized, plunger 164 moves to its upper position, opening bleed passageway 170 and closing fluid supply passageway 166. Pressure within control chamber 174, thus, bleeds off through bleed passageway 170. As the pressure above diaphragm 116 is reduced, the pressure in working chamber 176 overcomes the force of spring 172 and weight 142 to lift or extend diaphragm 116 away from valve seat 114.

As should be evident from the foregoing description, the restraining means used to limit extension of diaphragm 116 may take a wide variety of forms other than the insert in the embodiment of FIGS. 1 and 2 or the contoured housing wall in the embodiment of FIG. 3. For example, the restraining means may be a flexible coupling between the valve seat and the diaphragm. Such coupling would be adapted to allow fluid to flow to the fluid outlet in the valve open state, but would prevent the diaphragm from exceeding its maximum working extension.

Figure 4:
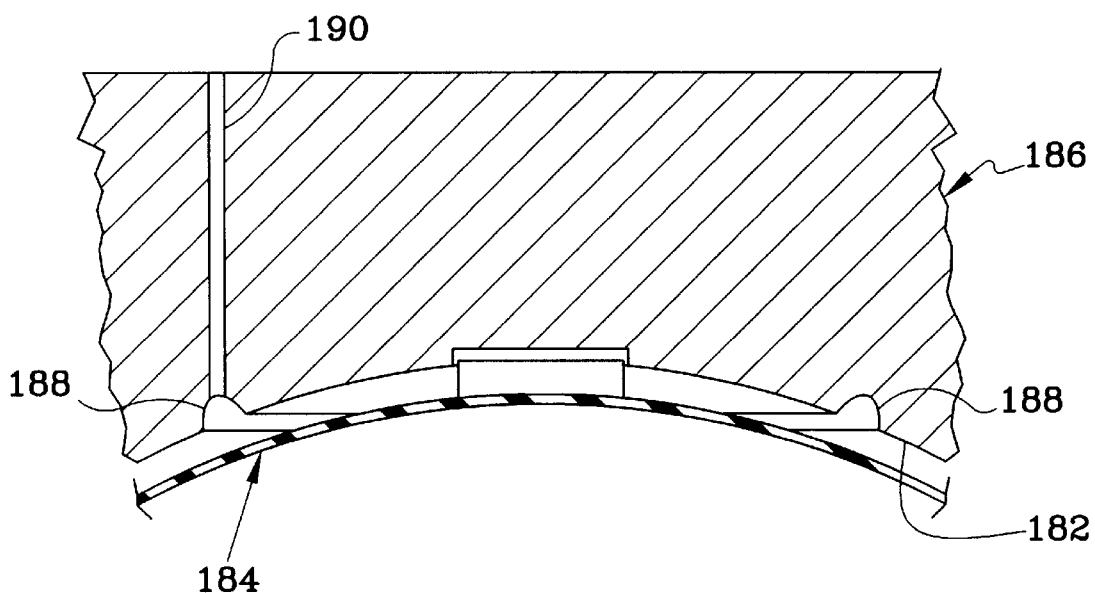
FIG. 4 is an enlarged, cross-sectional view of a portion of the alternative diaphragm valve embodiment of FIG. 3, showing a feature which may be incorporated into the valve embodiment.

Previously described diaphragm valve embodiments 10 and 110 are shown with engagement surfaces 50 and 130 respectively contoured to receive diaphragms 16 and 116. In order to facilitate fluid flow above the diaphragm, particularly in embodiments in which the engagement surface is formed on a non-porous material, an additional opening may be provided. FIG. 4 depicts this feature in a diaphragm valve embodiment 180, including an engagement or support surface 182 and a diaphragm 184. Engagement surface 182 is formed on a body 186 which may be a separate insert (e.g., insert 18 of FIG. 1) or on an integral portion of a valve housing (c.g., upper housing section 120 of FIG. 3). In either case, body 186 has formed therein a channel 188 in a fluid communication with a relief port 190. In a valve open state, diaphragm 184 is generally received by and may be pressed tightly against engagement surface 182 so as to essentially form a seal. Channel 188, however, remains open relative to diaphragm 184. As diaphragm valve 180 transitions to a valve closed state, channel 188 and relief port 190 facilitate necessary flow of fluid between engagement surface 182 and diaphragm 184. This fluid flow is directed through the relief port 190. As a result, diaphragm 184 will quickly disengage from engagement surface 182. Alternatively, channel 188 may be replaced by a plurality of openings or notches configured to facilitate fluid flow between the engagement surface and the diaphragm.

In accordance with the foregoing description, the applicant has provided a simple and inexpensive diaphragm valve design improvement which substantially increases the allowable valve working pressure. Although particular embodiments have been shown and described in detail for illustrative purposes, various changes in form within the spirit and scope of the present invention will be apparent to those of ordinary skill in the relevant technologies. It is not intended that coverage be limited to the disclosed embodiments, but only by the terms of the following claims.

I claim:

1. A diaphragm valve comprising:

a housing defining a fluid inlet and a fluid outlet;

a valve seat positioned within said housing between the fluid inlet and the fluid outlet;

a diaphragm positioned within said housing and cooperating therewith to form a control pressure chamber on a first side of said diaphragm, said diaphragm being displaceable by a pressure differential thereaccross between first and second limiting positions respectively in sealing contact with and spaced from said valve seat; and an engagement surface within the control pressure chamber and fixed relative to said housing, said engagement surface being configured to contact substantially the entire first side of said diaphragm when the pressure differential thereacross is insufficient to displace said diaphragm toward its first limiting position.

2. The diaphragm valve of claim 1, wherein said diaphragm is positioned between said valve seat and said engagement surface.

3. The diaphragm valve of claim 2, wherein:

said diaphragm has a maximum working extension at which it will reliably perform; and said engagement surface is positioned to prevent said diaphragm from exceeding the maximum working extension thereof.

4. The diaphragm valve of claim 3, wherein said engagement surface is positioned to limit extension of said diaphragm to approximately 80–90 percent of its maximum working extension.

5. The diaphragm valve of claim 4, further comprising an insert member secured within said housing, said engagement surface being formed on said insert member.

6. The diaphragm valve of claim 5, wherein said engagement surface includes a port for facilitating introduction and evacuation of control pressure between said diaphragm and said engagement surface.

7. An insert for use in a diaphragm valve including a housing defining a fluid inlet and a fluid outlet, a valve seat positioned within the housing between the fluid inlet and the fluid outlet, and a diaphragm disposed within the housing adjacent the valve seat, the diaphragm being selectively extendable from a seated position, in which the diaphragm seals against the valve seat, to a fully extended position, the insert comprising:

a member formed of a foam material having an engagement surface thereon positioned and configured to limit extension of said diaphragm from the seated position thereof.

8. The insert of claim 7, wherein said member is formed of a porous foam material.

9. A method of increasing a pressure rating of a diaphragm valve including a housing defining a fluid inlet, a fluid outlet, a valve seat in the flow path between the fluid inlet and the fluid outlet and a cavity surrounding the valve seat, and a diaphragm having first and second sides separating the cavity into a control pressure chamber on a first side of the diaphragm and a region on the second side of the diaphragm exposed to fluid flowing between the fluid inlet and the fluid outlet through the valve seat, the diaphragm being displaceable relative to the valve seat by pressure in the control pressure chamber, the method comprising the steps of:

forming an insert configured to fit within the control pressure chamber, and having an engagement surface contoured to conform to the diaphragm when the diaphragm is displaced away from the valve seat; and mounting the insert within the control pressure chamber such that the engagement surface is positioned to contact the diaphragm over substantially its entire first side when the pressure in the control pressure chamber is insufficient to displace the diaphragm toward the valve seat against the pressure in said region on the second side of the diaphragm.

10. The method of claim 9, wherein the insert is formed of a porous foam material.

11. In a valve of the type having a body defining an inlet, an outlet, a valve seat in a fluid flow path between the inlet and outlet, and a cavity surrounding the valve seat, the valve further having a diaphragm with first and second opposing sides separating the cavity into a control pressure chamber on the first side of the diaphragm and a region on the second side of the exposed to fluid supplied through the inlet, the diaphragm being displaceable relative to the valve seat by pressure in the control pressure chamber to control fluid flow between the inlet and the outlet, an improvement which comprises:

a support surface in the control pressure chamber fixed relative to the valve body and contoured to contact the diaphragm over substantially the entire first side thereof to restrain the diaphragm when pressure in the control pressure chamber is insufficient to displace the diaphragm toward the valve seat against pressure in said region on the second side of the diaphragm.

12. The valve of claim 11 wherein the support surface is formed on the body within the control pressure chamber.

13. The valve of claim 12 wherein the support surface is configured with a channel therein for facilitating introduction and evacuation of control pressure between the diaphragm and said support surface.

14. The valve of claim 11 including an insert mounted in the control pressure chamber and having the support surface formed thereon.

15. The valve of claim 14 wherein said insert is formed of a foam material.

16. The valve of claim 15 wherein said insert is formed of a porous foam material.

* * * * *